July 28, 1959
J. W. McCLELLAND
2,896,685
ANTISKID DEVICE
Filed April 11, 1957
3 Sheets-Sheet 1
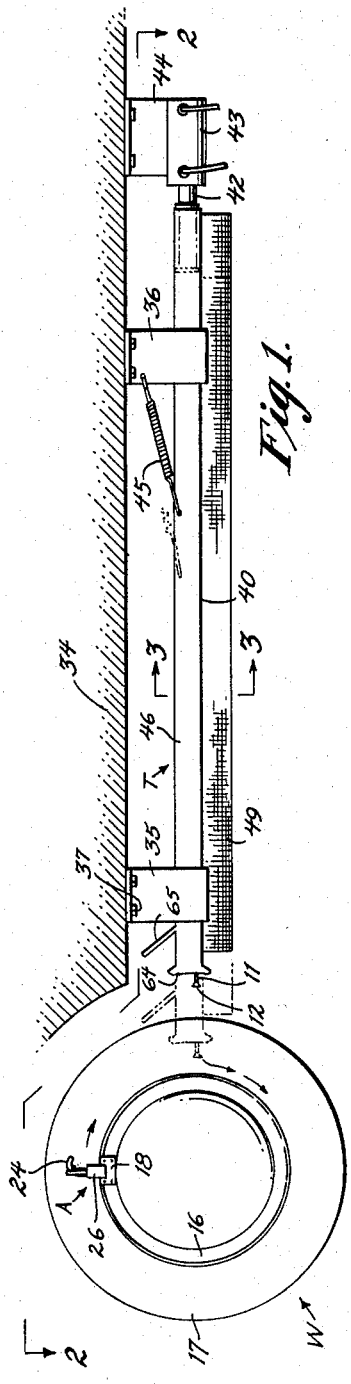
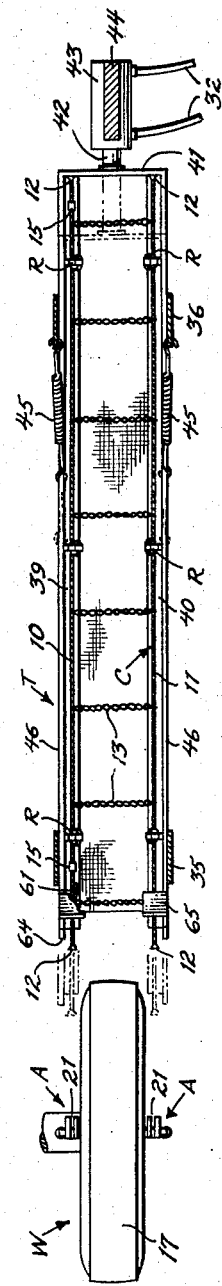
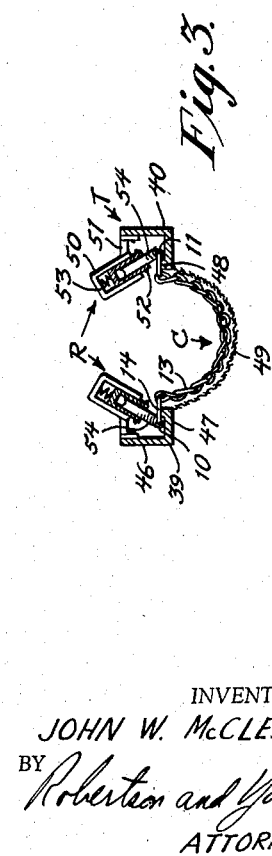
INVENTOR.
JOHN W. McCLELLAND
BY
*Robertson and Youte*
ATTORNEYS.

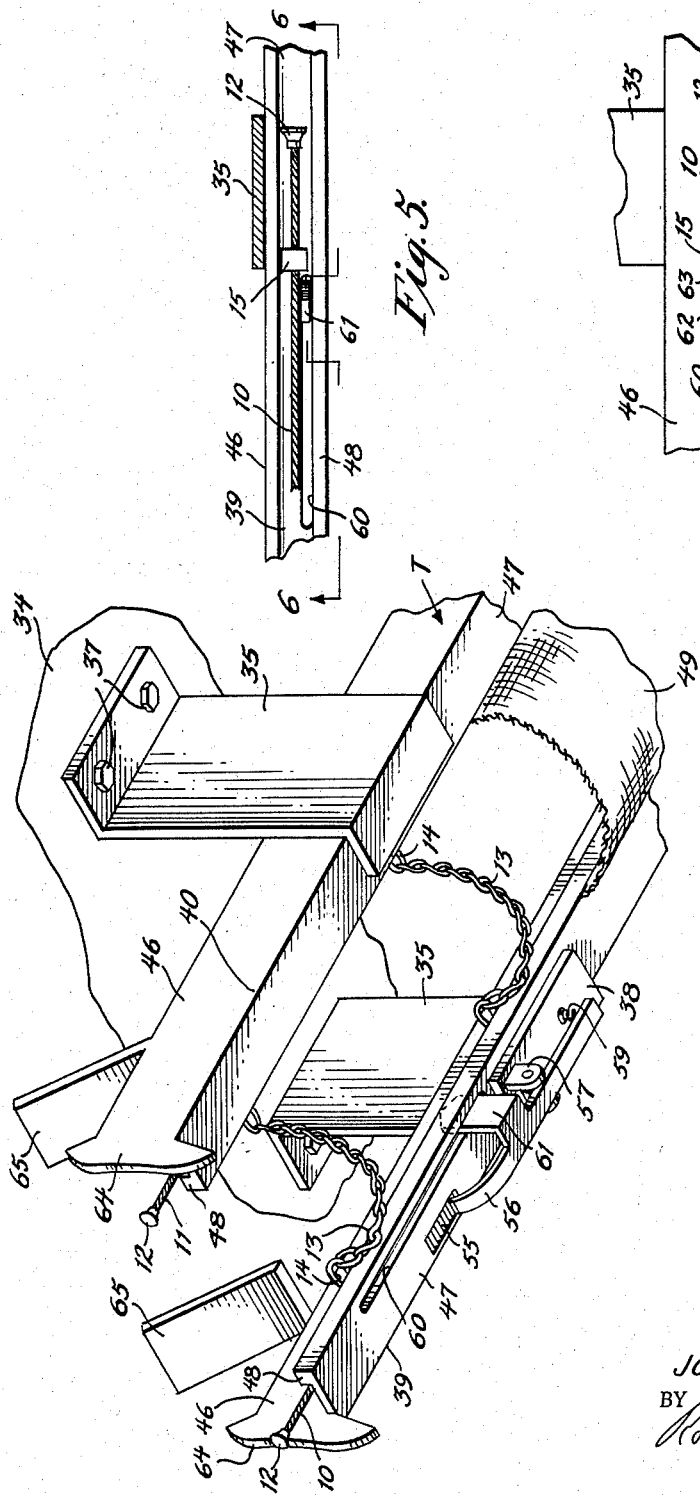

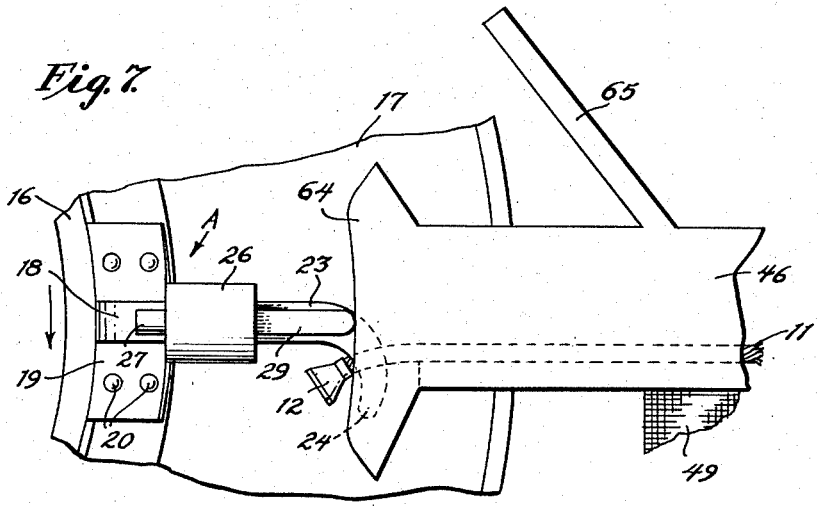
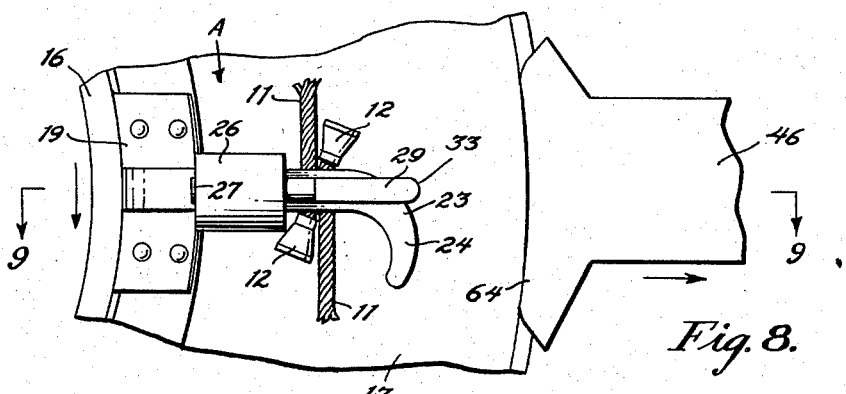
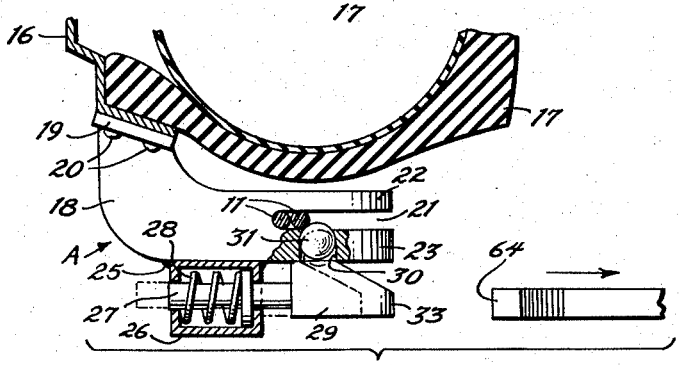

United States Patent Office 2,896,685
Patented July 28, 1959

2,896,685

ANTISKID DEVICE

John W. McClelland, Philadelphia, Pa., assignor of one-half to George H. Mensch, Jr., Philadelphia, Pa.

Application April 11, 1957, Serial No. 652,217

11 Claims. (Cl. 152—214)

The present invention relates to antiskid devices for motor vehicles and is concerned primarily with an attachment that is designed to be installed on the body of a vehicle and which is readily adapted to apply an antiskid device to a tire with a minimum of inconvenience to the operator.

For many years, those recognizing the dangers and hazards of driving on slippery and icy roads have been dealing with the problem of providing antiskid devices for automotive tires. Such devices are provided not only for safety purposes, but also to provide traction in mud, snow, and the like. The antiskid device which, up to the present time, has met with the widest acceptance by the using public is the conventional tire chain which consists essentially of a pair of side chains with cross or tread chains extending therebetween. After once being applied to the tire, such chains perform the office required of them. However, considerable difficulty and inconvenience is experienced by the motorist in applying the chains to the tires and removing them therefrom.

With the foregoing conditions in mind, the present invention has in view as its foremost objective the provision of a novel set of tire chains which are adapted to be mechanically applied to a tire or removed therefrom without in either case jacking the tire up.

More in detail, the invention has as an object the provision of a tire chain which consists essentially of a pair of side cables which replace the side chains heretofore used with cross or tread chains extending therebetween. These side cables are wire cables which, while flexible to the extent necessary to permit their application to a tire, are sufficiently rigid to permit of their being pushed or thrust during certain operative movements hereinafter to be described.

Still another object of the invention is to provide, in a tire chain of the character aforesaid, a pair of side cables each of which is formed at each end with an abutment member that cooperates with an anchoring device on a wheel to secure the chain in position over the tire carried by the wheel.

Another object in view is to provide, on an automotive wheel carrying a tire, a pair of anchoring devices on opposite sides each of which is adapted to first engage the abutment on one end of a side cable of a chain of the type above noted and, under the influence of rotative movement on the part of the wheel, wrap the chain about the tire; whereupon the anchoring device engages the abutment at the other end of the side cable to complete the anchorage of the chain to the wheel.

Still another object of the invention is to provide an attachment that is designed to be installed on an automotive vehicle in proper relation with respect to a tired wheel thereof; and which attachment is adapted to support a tire-chain assembly of the character above indicated in such a manner that it may be moved into a position in which the anchoring devices on the wheel are effective to engage the abutments on the tire-chain assembly and withdraw the latter from the attachment, at the same time wrapping it about the tire.

More in detail, the invention has as an object the provision of an attachment of the type indicated which consists essentially of a pair of tracks that are mounted for longitudinal shifting movement on the underside of a motor-vehicle body in line with a rear tire thereof; and which tracks are adapted to support a tire-chain assembly of the character indicated, with the side cables properly co-related with respect to the tire, together with means under the control of the operator of the vehicle for shifting the track into and out of the position in which the anchoring devices on the wheel engage the abutments aforesaid.

Detailed objects and advantages of the invention are associated with the provision of detent mechanism for holding the track in an adjusted position for automatically releasing the track from this position and the provision of cooperating cam elements on the track and anchoring devices aforesaid which release or open the anchoring devices at the proper time in relation to movement of the track. These will in part become apparent and in part be hereinafter stated as the description of the invention proceeds.

The invention therefore comprises a novel tire-chain assembly characterized by the presence of semirigid flexible side cables having abutments on each end thereof, anchoring devices intended to be applied to a wheel of a motor vehicle and which anchoring devices engage the abutments aforesaid, and an attachment for the tire body comprising a longitudinal shifting track for supporting the tire-chain assembly.

For a full and more complete understanding of the invention, reference may be had to the following description and accompanyinging drawing, wherein:

Figure 1 is a view in side elevation depicting a portion of a motor-vehicle body, a rear wheel, with the attachment of this invention applied to the body and the anchoring devices on the wheel;

Figure 2 is a top plan view looking down on the attachment with the tire-chain assembly therein and the wheel and side taken about on the plane represented by the line 2—2 of Figure 1;

Figure 3 is a vertical section through the track and tire-chain assembly supported thereby, and is taken about on the plane represented by the line 3—3 of Figure 1;

Figure 4 is a perspective view taken on an enlarged scale of one end of the track looking upwardly from the underside;

Figure 5 is another detail taken on an enlarged scale as a horizontal plan of that portion of the track carrying the detent mechanism and showing the relation of a cable thereto;

Figure 6 is a side elevation taken normal to the showing of Figure 5;

Figure 7 is a detail taken on an enlarged scale showing one end of the track and one of the anchoring devices in position to pick up a cable;

Figure 8 is a view similar to Figure 7 showing the condition of the cable ends after the chain has been applied about the tire; and Figure 9 is a detailed horizontal section taken about on the plane represented by the line 9—9 of Figure 8.

*General combination*

The present invention comprises three main parts. These are:

(1) The novel tire-chain assembly;
(2) The anchoring devices which are applied to the opposite sides of each rear wheel of a car; and
(3) The attachment including the track which supports the chain assembly.

The general idea is to support a novel chain assembly beneath the vehicle body in advance of a rear wheel so that, when an operator of the vehicle is confronted with a condition requiring an antiskid device, he merely operates an operating member that is located in a position convenient to the driver's seat to shift the track carrying the chain assembly rearwardly into a position in which the anchoring devices on the wheel will engage the abutment members on the side cables and, under the influence of the rotative movement of the wheel caused by movement of the car, wtihdraw the chain assembly from the track and wrap it about the tire; and, upon the completion of a full revolution, the anchoring devices engage the abutments at the opposite ends of the cables to complete the anchorage of the tire assembly on the tire.

Once the anchoring devices have initially engaged the side cables, the track is automatically retracted. When it is desired to remove a chain assembly from a wheel, the driver simply again operates the operating member to shift the track assembly back into a position in which cams on the ends thereof engage the anchoring devices to open the latter and cause rotative movement of the wheel to feed the chain assembly back into the track.

The tire-chain assembly

Referring now more particularly to Figure 2, the tire-chain assembly of this invention is referred to in its entirety by the reference character C. It comprises a pair of side cables 10 and 11, with each cable having an abutment member 12 on the free end thereof. These abutments 12 are more clearly shown in Figures 7 and 8 and preferably comprise a conical steel member that is welded to the end of the wire cable from which the side cables 10 and 11 are made. The important thing is that these abutment members 12 be firmly secured to each end of each side cable.

Extending between the side cables 10 and 11 at appropriately spaced intervals are the cross or tread chain members 13. As is more clearly shown in Figures 3 and 4, each cross chain 13 preferably has one end secured to an eye or loop 14, which is in turn anchored in a rigid manner to the respective side cable 10 or 11. Each of these eyes 14 has an extent somewhat greater than that of a link of the chain and extends inwardly from the side cable to which it is secured an appropriate distance to clear the track, as will be later described.

The cable 10 carries at each end an abutment cam 15 that is spaced inwardly from the abutment 12. The purpose of these abutment cams 15 will later be described.

The anchoring devices

A rear wheel of a motor vehicle is depicted at W in Figure 1. The rear wheel W will include a rim 16 on which is mounted a conventional tire 17. A pair of anchoring devices A are mounted on opposite sides of the rim 16. Inasmuch as these anchoring devices A are substantial duplicates, only one of them is herein described in detail, as that is believed to be sufficient for the purposes of this specification.

Each anchoring device A comprises a bracket member 18 that is carried by a pedestal 19, with the latter being fixedly secured to the rim 16 as by the rivets shown at 20.

The end of the bracket 18 is formed with a slot 21, leaving a narrow arm 22 on the inner side of the slot and a wider arm 23 on the outer side. These arms 22 and 23 are curved downwardly as shown in Figures 7 and 8 to provide what in effect are a pair of spaced hooks 24. These hooks are intended to pass about one of the cables 10 or 11 behind an abutment 12 to cause the cable to be received in the slot 21, as will be later described.

Secured to the outer face of the bracket 18, as by the welding shown at 25, is a casing 26 which houses a plunger 27 that is biased by an expansion coil spring 28. The plunger 27 extends through the head of the casing 26 and carries a cam block 29, a side face of which slides over the outer side face of the arm 23. The latter is formed with a transverse opening 30 in which is received a ball detent 31. It is evident that, with the ball detent 31 in the full-line position of Figure 9, the slot 21 is restricted so that the cables 10 and 11 therein are securely held in the slot. Moreover, the ball detent 31 is securely held in this position when the cam block 29 closes the outer end of the passage 30. However, the end of the cam block 29 is formed with a cam surface 33 that is adapted to be engaged by a cam on the track end, to be later described, so that the block 29 is moved away from the opening 30 against the influence of the spring 28 so as to permit the ball detent 31 to move outwardly in the passage 30 and thus leave the slot 21 free and unrestricted.

It will be understood that, as the wheel W rotates, the anchoring devices A will rotate with it. Thus, with the track, to be later described, shifted into proper position, the cams thereon will affect the block 29 so as to open the slots 21. At the same time, the hooks 24 on the ends of the arms 22 and 23 will engage the abutments 12 on the ends of the cables 10 and 11 and pull them into the slots 21. The latter are immediately closed by the action of the ball detents 31 under the influence of the cam blocks 29 and springs 28; and on the next revolution of the tire the same action takes place to pick up the other ends of the cables 10 and 11.

The track

The body of a motor vehicle is represented at 34 in Figure 1. Secured to the underface of this body 34 are two pairs of brackets 35 and 36. This connection may be achieved in any preferred manner such as the bolts shown at 37.

Each of the brackets 36 and 37 has an inturned bottom flange 38 (Figure 4) which supports a track assembly that is referred to in its entirety by the reference character T.

The track assembly T comprises a pair of track members 39 and 40 (Figure 3) which are held in spaced relation by an end crosspiece 41 that is shown in Figure 2. Secured to this end crosspiece 41 is a piston 42 that is received in a hydraulic cylinder 43. The latter is supported in proper position by a bracket 44, which is in turn secured to the car body 34. Hydraulic lines 32 extend to an appropriate source of hydraulic power such as is well known in the hydraulic art; and it is notable that the cylinder 43 includes a slow-leaking valve. Thus, once the cylinder has been actuated to shift the track assembly towards the rear wheel, it will hold the track assembly in this position for a predetermined interval until the valve has leaked sufficiently to permit the track assembly to be returned to its original position under the influence of a pair of tension springs 45, as will be later described.

As shown in Figure 2, each of the springs 45 has one end anchored to one of the tracks 39 or 40 and its other end to one of the brackets 36.

Each of the tracks 39 and 40 includes a side wall 46 and a bottom wall 47 formed with an upturned lip 48. Between the inner edges of the bottom walls 47 there is suspended a canvas strip 49 which has a catenary corresponding to that of the cross chains 13 which are supported thereby.

The side cables 10 and 11 are received in the tracks 39 and 40, respectively. In order to hold them in this position, retaining rollers are mounted on the side walls 46 at appropriate intervals. Each of these retaining-roller assemblies is referred to in its entirety by the reference character R, and they are all substantially alike. Thus each roller assembly R comprises a U-shaped member 50 that is secured to a side wall 46 by an arm 51. Slidably mounted in each U-shaped member 50 is an inner U-shaped member 52 that is normally urged out of the U-shaped member 50 by an expansion coil 53. A roller 54 is journaled in the inner U-shaped member 52 and has a grooved peripheral edge which receives the cable 10 or 11. Obviously, these rollers will give or recede whenever one of the eyes 14 passes thereover.

Referring now more particularly to Figure 4, it will be noted that the underface of the bottom wall 47 of the track 39 is formed with a series of ratchet teeth 55. Cooperating with the teeth 55 is a pawl 56 that is pivotally mounted on a U-shaped bracket 57 that is carried on the underside of the bottom flange 38 of one of the brackets 35. An expansion coil spring 59 is interposed between the other end of the pawl 56 and the flange 38 so as to normally urge the effective end of the pawl 56 into engagement with the rack teeth 55.

The bottom wall 47 of the track 39 is formed with a slot 60; and extending upwardly through this slot is an arm 61 that is carried by the pawl 56 and the end of which is formed with cam surfaces 62 and 63. The latter are adapted to be engaged by the abutment cams 15 on the side cable 10 to release the pawl as will be later described.

Each end of each side wall 46 of the tracks 39 and 40 is formed as a cam 64; and each cam 64 is adapted for cooperation with the cam surface 33 on a cam block 29 to move the latter away from the passage 30 so as to release the ball detent 31 and hold it released until a cable is fully seated in a slot 21. After a cam 64 rides off a cam surface 33, the cam block 29 is moved out into the position in which it holds the ball detent 31 in locking postion under the influence of the spring 28.

*Operation*

While the mode of operation of the mechanism of this invention is believed to be obvious from the illustration of the drawings and description of parts given, it may be briefly outlined as follows:

It will be assumed that a track assembly T is mounted on each side of the car on the car body in front of the rear wheels; and each rear wheel has a pair of the anchoring devices A attached to the opposite sides of the rim 16. The operation will be described only in conjunction with one chain assembly, one wheel, and one track assembly.

With a chain assembly C supported in a track assembly T and the latter in its normally retracted position, as the car is driven, nothing happens; that is, the car is simply operated in the usual manner, and the tread surface of the tire 17 engages the road.

When a condition arises requiring the use of the antiskid device, the driver of the car operates an operating member to deliver a hydraulic medium under pressure to the cylinder 43. This causes the piston 42 to move toward the rear wheel W, which is, of course, accompanied by a longitudinal shifting of the track assembly T in that direction. The amount of such movement is in the nature of six inches and is sufficient to bring the cam 64 in position to engage the cam surfaces 33 on the cam blocks 29.

At the same time, the rack teeth 55 will be brought into engagement with the pawl 56 so that the latter will hold the track assembly in its shifted position.

It is to be remembered that there is an abutment cam 15 on the end of the cable 10 adjacent to the wheel W; and during the initial withdrawing movement of the chain assembly from the track this abutment cam 15 will ride over the cam surface 63 and thus momentarily release the pawl 56 from the rack 55. However, due to the slow leak in the hydraulic cylinder, this initial release of the pawl has no effect, as the hydraulic pressure will still be effective to hold the track in its adjusted position.

As the cams 64 engage the cam surfaces 33, the slots 21 are left free and unrestricted so that the hooks 24 pass over the cables 10 and 11 within the end abutments 12. As the surfaces 33 ride off the cams 64, the ball detents are returned to their locking position. As the car is driven, the wheel W rotates and the chain assembly C is withdrawn from the track T and wrapped about the tire 17. This takes place during a complete revolution of the wheel; and during this interval is held in its shifted position by the pawl 56. As the abutment cam 15 on the end of the cable 10 remote from the wheel passes over the cam surface 63, the pawl 56 is released to permit the return of the track T to its original position under the influence of the springs 45. However, just before this takes place, the cam 64 will have again opened the slots 21 so as to permit of the reception therein of the remote ends of the cables 10 and 11. The slots are then closed, and the cable ends assume the positions depicted in Figure 8, in which the chain assembly is wrapped about the tire and securely held in position thereon. Moreover, the anchoring devices A constitute an effective mechanical interlock between the chain assembly and the wheel so that the traction effects afforded thereby are transmitted to the wheel. That is, the chain assembly cannot slip relative to the tire or wheel.

When it is desired to remove the chain assemblies from the wheel, the driver simply again operates the operating member to deliver the hydraulic medium under pressure to the cylinder 43. This causes the track to be shifted into the position in which the cam 64 will again engage the cam surfaces 33. On the first such engagement, the slot 21 is opened; and the ends of the cables 10 and 11 will spring outwardly therefrom under their own resiliency and be fed into the tracks 39 and 40. To insure of the proper initial entry of the ends of the cable in this manner, baffle plates such as shown at 65 may be provided.

It is to be remembered that the cables 10 and 11 are semi-rigid, and they will be fed into the tracks 39 and 40 as the car is driven.

As this action takes place, the abutment cam 15 on that end of the cable will engage the cam surface 62 to release the pawl 56; but this will have no effect due to the nature of the hydraulic cylinder 43. However, after the completion of a full revolution, there is a second engagement of the cam 64 with the cam surfaces 33 to release the other ends of the cables 10 and 11 therefrom; and as these ends of the cables ride into the track the abutment cam 15 on the cable 10 will engage the cam surface 62 to release the pawl 56 and permit the track to be returned to its original position under the influence of the springs 45.

While a preferred specific embodiment of the invention is hereinbefore set forth, it is to be clearly understood that the invention is not to be limited to the exact constructions, mechanisms, and devices illustrated and described, because various modifications of these details may be provided in putting the invention into practice within the purview of the appended claims.

What is claimed is:

1. In combination, a rim, a tire on said rim, a pair of anchoring devices attached to the opposite sides of said rim, a chain assembly applicable about said tire and including a pair of semirigid side cables each having an abutment on each end engageable by one of said anchoring devices, a track assembly for supporting said chain assembly, supporting means for said track assembly attachable to a car body, hydraulic means for longitudinally shifting said track assembly, and detent means for holding said track assembly in a shifted position.

2. In combination, a car body, bracket members attached to said body, a pair of tracks carried by said bracket members and slidable relative thereto, means for shifting said track members, and a detent carried by one of said bracket members for holding said tracks in a shifted position.

3. In combination, a car body, bracket members attached to said car body, a pair of tracks carried by said bracket members and slidable relative thereto, means for shifting said track members, a detent carried by one of said bracket members for holding said tracks in a shifted position, and means carried by said tracks for retaining a chain assembly therein.

4. In combination, a car body, bracket members on said body, a pair of tracks carried by said bracket members and slidable relative thereto, means for shifting said track members, a detent carried by one of said bracket members for holding said tracks in a shifted position, a chain assembly including side cables, and spring-biased rollers carried by said tracks and engageable with said side cables to properly maintain said cables in said tracks.

5. In combination, a car body, brackets attached to said car body, a pair of complemental tracks shiftably mounted in said brackets, a hydraulic cylinder-and-piston assembly having a slowly leaking relief valve and a piston connected to said tracks, and a detent carried by one of said brackets for holding said tracks in an adjusted position.

6. In combination, a car body, brackets attached to said car body, a pair of complemental tracks shiftably mounted in said brackets, a chain assembly including side cables on said tracks, a car wheel, an anchoring device on said wheel, a cam on one end of each track and engageable with said anchoring device to open said anchoring device for the reception of an end of one of said cables therein, a hydraulic cylinder-and-piston assembly having a slowly leaking relief valve and a piston connected to said tracks, and a detent carried by one of said brackets for holding said tracks in an adjusted position.

7. In combination, a wheel having a rim, a tire on said wheel, a bracket secured to said rim, said bracket being formed with a slot defined by a pair of hooked arms, a chain assembly including side cables, and a yieldable detent carried by one of said arms for holding an end of one of said cables in said slot.

8. In combination, a wheel having a rim, a tire on said rim, a bracket secured to said rim, said bracket being formed with a slot defined by a pair of hooked arms, a ball detent operatively mounted on one of said arms and movable into position restricting said slot, and a spring-biased cam block cooperating with said ball detent to hold the latter in locking position.

9. In combination, a wheel having a rim, a tire on said rim, a bracket secured to said rim, said bracket being formed with a slot defined by a pair of hooked arms, a ball detent operatively mounted on one of said arms and movable into position restricting said slot, a cam block slidably mounted on a face of said bracket and movable into and out of operation engaging said ball detent to hold the latter in locking position, spring means normally holding said cam block in engagement with said ball detent, a track assembly, a cam on said track assembly, and a cam surface on said block engageable by said cam to shift said block out of engagement with said ball detent.

10. In combination, a car body, a wheel on said body, a track assembly shiftably mounted on said body, spring means normally holding said track assembly in a predetermined position relative to said car body, means for shifting said track assembly against the influence of said spring means, locking means for holding said track assembly in a shifted position, a chain assembly supported by said track assembly and including a pair of semirigid side cables with cross-tread chains extending therebetween at spaced intervals, abutment cams on one of said cables and spaced inwardly from the ends thereof, said abutment cams being releasably engageable with said locking means, an abutment on each end of each side chain, and a pair of anchoring devices on said wheel engageable with said abutments to draw said chain assembly from said track assembly and wrap it about a tire on said wheel.

11. In combination, a car body, a wheel on said body, a track assembly shiftably mounted on said body, spring means normally holding said track assembly in a predetermined position relative to said car body, means for shifting said track assembly against the influence of said spring means, locking means for holding said track assembly in a shifted position, cams on the end of said track assembly adjacent to the wheel, a chain assembly supported by said track assembly and including a pair of semirigid side cables with cross-tread chains extending therebetween at spaced intervals, abutment cams on one of said cables and spaced inwardly from the ends thereof, said abutment cams being releasably engageable with said locking means, an abutment on each end of each side chain, a pair of anchoring devices on said wheel engageable with said abutments to draw said chain assembly from said track assembly and wrap it about a tire on said wheel, and spring-biased cam blocks included as parts of said anchoring devices having cam surfaces engageable by said cams to open said anchoring devices for the reception or ejection of cable ends therein or therefrom.

References Cited in the file of this patent

UNITED STATES PATENTS

| | | |
|---|---|---|
| 1,325,333 | Ryan | Dec. 16, 1919 |
| 2,252,027 | Pasquarella, Jr. | Aug. 12, 1941 |
| 2,493,994 | Newman | Jan. 10, 1950 |
| 2,633,888 | Vecchioni | Apr. 7, 1953 |
| 2,762,412 | Mank | Sept. 11, 1956 |